(12) United States Patent
Joyce

(10) Patent No.: US 11,121,638 B2
(45) Date of Patent: Sep. 14, 2021

(54) FOUR-MODE TAP-SWITCHING TRANSFORMER RECTIFIER

(71) Applicant: HAMILTON SUNDSTRAND CORPORATION, Charlotte, NC (US)

(72) Inventor: Thomas P. Joyce, Rockford, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/529,963

(22) Filed: Aug. 2, 2019

(65) Prior Publication Data

US 2021/0036629 A1 Feb. 4, 2021

(51) Int. Cl.
*H02M 7/12* (2006.01)
*H02M 7/04* (2006.01)

(52) U.S. Cl.
CPC .............. *H02M 7/12* (2013.01); *H02M 7/043* (2013.01)

(58) Field of Classification Search
None
See application file for complete search history.

(56) References Cited

U.S. PATENT DOCUMENTS

| 3,654,537 A | 4/1972 | Coffey |
| 5,461,297 A | 10/1995 | Crawford |
| 5,903,066 A * | 5/1999 | Enjeti ................. H02M 1/4216 307/105 |
| 6,256,213 B1 | 7/2001 | Illingworth |
| 9,494,124 B2 | 11/2016 | Dudley |
| 2012/0032651 A1* | 2/2012 | Torrico-Bascope ......... H02M 1/4216 323/209 |
| 2013/0235635 A1* | 9/2013 | Takahagi ................ H02J 7/022 363/127 |
| 2014/0146574 A1* | 5/2014 | Worek .............. H02M 3/33507 363/17 |
| 2020/0052608 A1* | 2/2020 | Bala .................... H02M 1/4216 |

OTHER PUBLICATIONS

European Search Report; European Application No. 19214766.8; Application Filed: Dec. 10, 2019; Search Report dated Jul. 13, 2020, 9 pages.

* cited by examiner

*Primary Examiner* — Jeffrey A Gblende
*Assistant Examiner* — Henry E Lee, III
(74) *Attorney, Agent, or Firm* — Cantor Colburn LLP

(57) ABSTRACT

Systems and methods for operating a transistor rectifier unit are provided. Aspects include providing a first transformer output and a second transformer output, providing a plurality of rectifier circuits, wherein the plurality of rectifier circuits comprises a first rectifier coupled to the first transformer output and a second rectifier coupled to the second transformer output, and wherein the first rectifier comprises a first output voltage and the second rectifier comprises a second output voltage, operating a plurality of switches based on a plurality of operational modes, wherein the plurality of operational modes comprises a first mode, a second mode, and a third mode, and wherein the plurality of switches comprises a first switch, a second switch, and a third switch.

16 Claims, 3 Drawing Sheets

FOUR-MODE TAP-SWITCHING TRANSFORMER RECTIFIER

BACKGROUND

The present invention generally relates to transformer rectifier units (TRU), and more specifically, to a four-mode tap-switching transformer rectifier unit.

Transformers are static electrical devices that transfer electrical energy between two or more circuits. A varying current in one coil of the transformer produces a varying magnetic flux, which, in turn, induces a varying electromotive force across a second coil wound around the same core. Transformers are used for increasing or decreasing the alternating voltages in electric power applications. Rectifiers are an electrical device that converts alternating current (AC), which periodically reverses direction, to direct current (DC), which flows in only one direction.

Transformer rectifier units (TRUs) combine transformers with rectifiers to be utilized for alternating current (AC) to direct current (DC) power supplies. In a typical application, these TRUs receive a regulated three-phase high-voltage AC at a step down transformer and rectify the transformer secondary output to create a DC output voltage.

SUMMARY

Embodiments of the present invention are directed to system. A non-limiting example of the system includes a transformer comprising a first transformer output and a second transformer output, a plurality of rectifier circuits, wherein the plurality of rectifier circuits comprises a first rectifier coupled to the first transformer output and a second rectifier coupled to the second transformer output, and wherein the first rectifier comprises a first output voltage and the second rectifier comprises a second output voltage, a plurality of switches, wherein the plurality of switches comprises a first switch, a second switch, and a third switch, and a logic circuit configured to operate the plurality switches based on a plurality of operational modes, wherein the plurality of operational modes comprises a first mode, a second mode, and a third mode.

Embodiments of the present invention are directed to a method for operating a transformer rectifier unit. A non-limiting example of the method includes providing a first transformer output and a second transformer output, providing a plurality of rectifier circuits, wherein the plurality of rectifier circuits comprises a first rectifier coupled to the first transformer output and a second rectifier coupled to the second transformer output, and wherein the first rectifier comprises a first output voltage and the second rectifier comprises a second output voltage, operating a plurality of switches based on a plurality of operational modes, wherein the plurality of operational modes comprises a first mode, a second mode, and a third mode, and wherein the plurality of switches comprises a first switch, a second switch, and a third switch.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

Turning now to an overview of technologies that are more specifically relevant to aspects of the disclosure, transformer rectifier units (TRUs) are typically used for AC-to-DC power supplies. In a typical application, these TRUs receive a regulated three-phase high-voltage AC at a step down transformer and rectify the transformer secondary output to create a DC output voltage. A modified version of a TRU, known as a Tap-Switching TRU, can operate over a wider input voltage range by adding circuitry which monitors internal TRU voltage and controls an electronic switch such that it operates with two series three-phase rectifiers to increase output voltage when the input voltage is low, and operates with a single three-phase rectifier when input voltage is higher. However, the above described tap-switching TRU is limited to two operational modes for when the input voltage is in a low range and a high range.

The above-described aspects address the shortcomings of the above described TRUs by providing a tap-switching transformer rectifier unit that operates in four operational modes according to one or more embodiments. This four-mode tap-switching TRU allows a power supply to operate over an even wider input voltage range by adding circuitry to operate the TRU in four modes.

Figure 1:
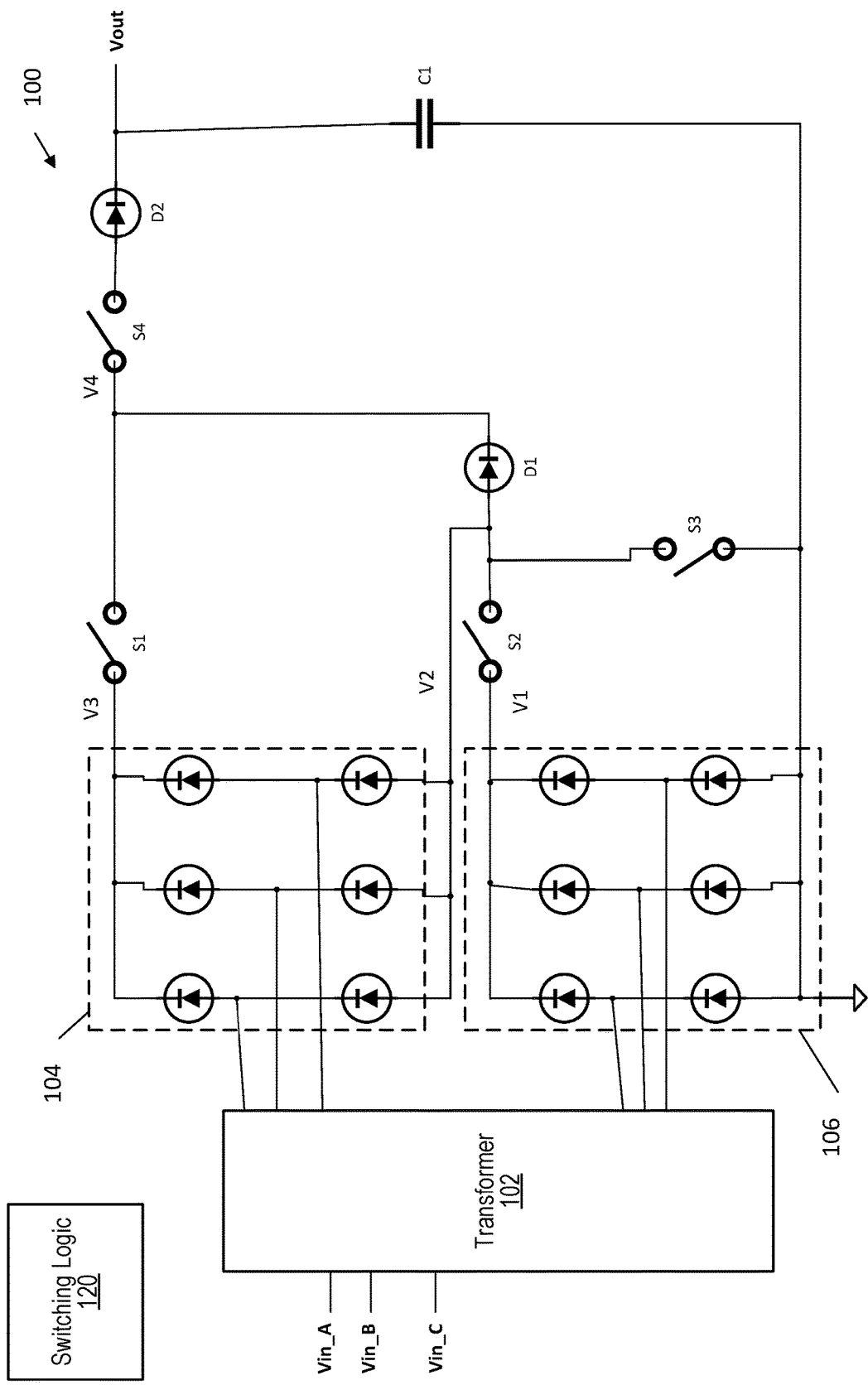
FIG. 1 depicts a circuit topology for a four-mode tap-switching transformer rectifier unit according to one or more embodiments.

FIG. 1 depicts a circuit topology for a four-mode tap-switching transformer rectifier unit according to one or more embodiments. The topology 100 includes a transformer 102, a top rectifier circuit 104, a bottom rectifier circuit 106, four switches including switch1 S1, switch2 S2, switch3 S3, and switch4 S4. The topology 100 also includes a capacitor C1 and two diodes D1, D2. The switches S1-S4 are operated by switching logic 120 which controls the state of the switches in either an open or closed state. When in an open state, the switches S1-S4 are not conducting and serve as an open circuit. When in a closed state, the switches S1-S4 are conducting electricity and operate similarly to a wire with very low impedance. The switching logic 120 is described in further detail in FIG. 2.

In one or more embodiments, the transformer 102 is a three phase transformer. Any three phase transformer can be utilized including but not limited to a Delta-Wye transformer, for example. The transformer 102 can include a primary winding and two secondary windings. The primary winding (Np), in some embodiments is a Wye type winding, can receive inputs Vin_A, Vin_B, and Vin_C. The two secondary windings can be of a combination of Delta windings and Wye windings. In some embodiments, the secondary windings can be any winding combination. The two secondary windings include the top winding (Ns1) that outputs to the top rectifier circuit 104 and the bottom winding (Ns2) that outputs to the bottom rectifier circuit 106. In one or more embodiments, the top winding (Ns1) is in a Wye configures and the bottom winding (Ns2) is in a Delta configuration and these secondary windings provide three-phase power to the top rectifier 104 and bottom rectifier 106, respectively. The top rectifier 104 and bottom rectifier 106 output rectified voltages V1 and V3.

As mentioned above and in one or more embodiments, the topology 100 operates in four operational modes responsive to an input voltage range. These four operational modes can be referred to as Mode 1, Mode 2, Mode 3, and Mode 4. Mode 1 is utilized when the input voltage range is lower than a low threshold voltage. The switches S1, S2, and S3 are controlled by sensing the output (V1) of the bottom rectifier 106 to determine the proper mode of operation to regulate the output voltage (Vout) as necessary for a given application or load. The switch S4 is controlled by sensing the source side of S4 (V4) for an overvoltage (high voltage). Mode 2 is utilized when the input voltage range is above the low threshold voltage but below a middle voltage threshold. Mode 3 is utilized when the input voltage range is above the middle voltage threshold but below the high voltage threshold. And Mode 4 is utilized when the input voltage range is above the high voltage threshold. The states of the switches for each operational mode is further described with references to Table 1. The output (V1) of the bottom rectifier is utilized herein for voltage sensing because this voltage relative to the output ground is not influenced by the state of the switches (S1-S4). This allows it to be used to control the switches with minimal control logic. In one or more embodiments, the bottom secondary winding (Ns2) rectified output voltage is larger than the top secondary winding (Ns1) rectified output voltage.

TABLE 1

Four-Mode Tap-Switching TRU Modes of Operation and Switch States

| Mode | S1 | S2 | S3 | S4 | Description |
|---|---|---|---|---|---|
| 1 | Closed | Closed | Open | Closed | Two series three-phase rectifiers |
| 2 | Open | Closed | Open | Closed | Bottom rectifier conducting only |
| 3 | Closed | Open | Closed | Closed | Top rectifier conducting only |
| 4 | Closed | Open | Closed | Open | Output is shut off |

In one or more embodiments, while in Mode 1, the two rectifiers 104, 106 are in series operating through both the delta and the wye configuration transformer secondaries (Ns2 and Ns1) with 30 degrees between phases for a total of 12 pulses per period. The delta and wye configuration transformer secondaries is exemplary and is not intended to limit the type of transformer utilized according to one or more embodiments. This is due to Switch1 being closed, Switch2 being closed, Switch3 being opened, and Switch4 being closed. The DC output voltage in this case is approximated by equation 1 below in terms of a three-phase RMS line-to-line input voltage. As described with reference to the following equations and utilizing a transformer with a top secondary being a wye configuration and the bottom secondary being a delta configuration, Np is the transformer primary number of turns, Ns1 is the transformer secondary 1 (i.e., top) number of turns, and Ns2 is the transformer secondary 2 (i.e., bottom) number of turns. Vin is the input voltage applied to the transformer primary, with units of Vrms, line-to-line.

$$Vout_{mode1}[Vdc] = Vin[Vrms, l-l] * \left( \left( \left( \frac{Ns2}{Np} \right) * \left( \frac{sqrt(2)*sqrt(3)}{pi} \right) \right) + \left( \left( \frac{Ns1}{Np} \right) * \frac{sqrt(2)*3}{pi} \right) \right) \quad \text{(Eq. 1)}$$

In one or more embodiments, while in Mode 2, only the bottom rectifier 106 is conducting, with the top rectifier 104 output switched off. This is due to Switch1 being open (i.e., not conducting), Switch2 being closed, Switch3 being open, and Switch4 being closed. In Mode 2, the DC output voltage (Vout) is approximated by equation 2 below.

$$Vout_{mode2}[Vdc] = Vin[Vrms, l-l] * \left( \left( \frac{Ns2}{Np} \right) * \left( \frac{sqrt(2)*sqrt(3)}{pi} \right) \right) \quad \text{(Eq. 2)}$$

In one or more embodiments, while in Mode 3, only the top rectifier 104 is conducting, with the top rectifier 104 output switched off and the top rectifier 104 referenced to output ground. This is due to Switch1 being closed, Switch2 being open, Switch3 being closed, and Switch4 being closed. In Mode 3, the DC output voltage is approximated by equation 3 below.

$$Vout_{mode2}[Vdc] = Vin[Vrms, l-l] * \left( \left( \frac{Ns1}{Np} \right) * \frac{sqrt(2)*3}{pi} \right) \quad \text{(Eq. 3)}$$

Figure 2:
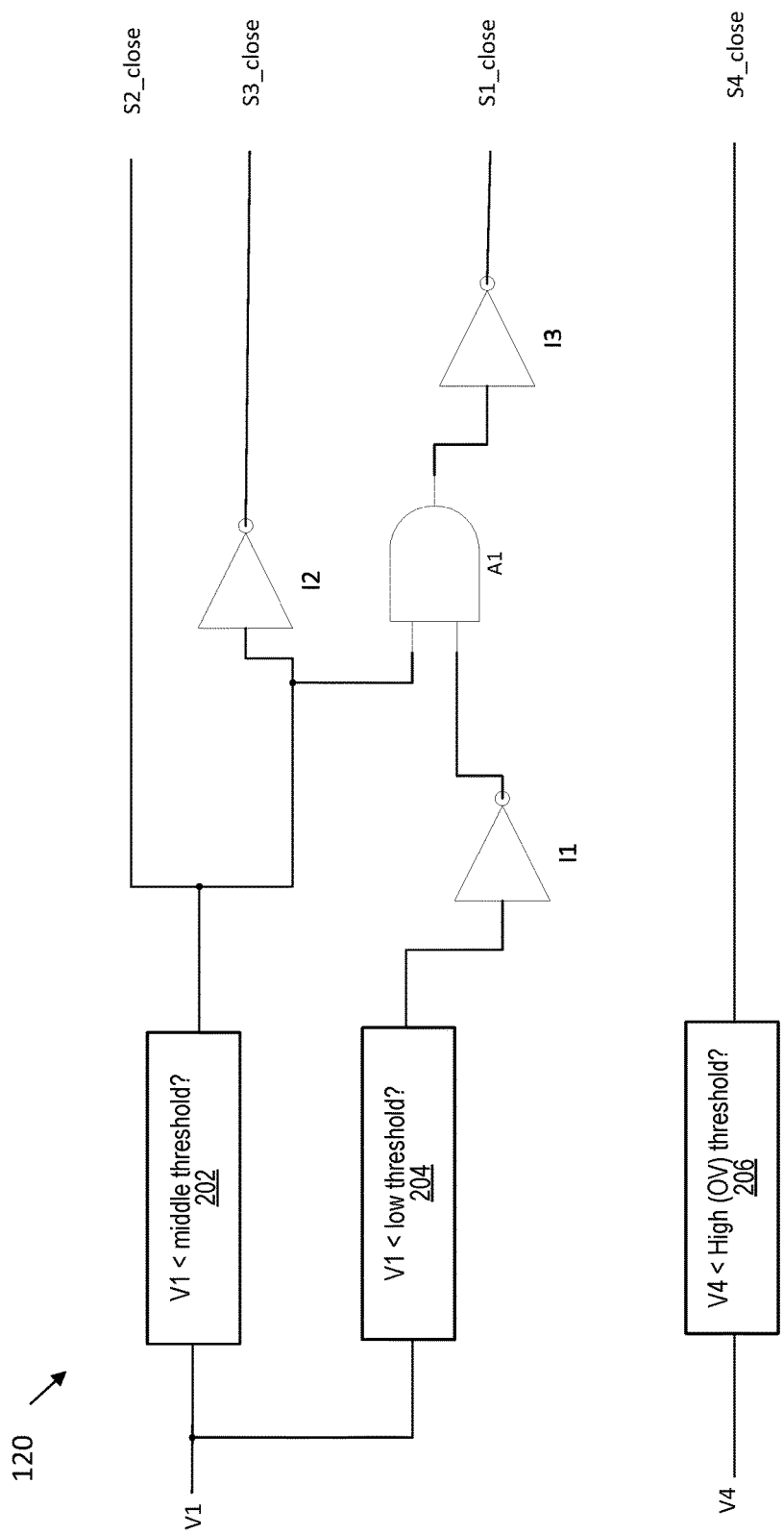
FIG. 2 depicts a block diagram of the switching logic for operating the switches in the circuit topology according to one or more embodiments.

In one or more embodiments, while in Mode 4, the Mode 3 switch states are persevered but with the TRU output being removed from the load by opening Switch4. Mode 4 represents an overvoltage shutdown mode. With the addition of Mode 3 to a tap-switching TRU, and with the topology 100 tuned such that the bottom rectifier 106 output is larger than the top rectifier output (e.g., V3-V2), the topology 100 can be optimized to regulate output voltage (Vout) within a constrained value over a wider range of input voltage. Additionally, the overvoltage shutdown mode (e.g. Mode 4) can protect output loads from input overvoltage conditions. The logic to implement the four control modes are described with reference to FIG. 2. FIG. 2 depicts a block diagram of the switching logic for operating the switches in the circuit topology according to one or more embodiments. The switching logic 120 includes three voltage comparators 202, 204, 206 and a plurality of logic gates includes three inverters I1, I2, I3, and an AND gate A1. The input to comparators 202 and 204 is V1 (from FIG. 1) which is the rectified voltage output of the bottom rectifier 104 (from FIG. 1). These two comparators 202 and 204 compare V1 to reference voltage thresholds, middle threshold and low threshold. The third comparator 206 compares the voltage V4 to a high reference voltage threshold to operate S4. So when the V1 voltage is less than the low voltage threshold and the middle threshold and V4 voltage is less than the high threshold, S1 is closed, S2 is closed, S3 is open, and S4 is closed (this is Mode 1 operation). When the V1 voltage is greater than the low voltage threshold but still less than the middle voltage threshold and V4 is less than the high threshold, S1 is open, S2 is closed, S3 is open, and S4 is closed, representing Mode 2. For Mode 3, the V1 voltage is greater than both the low threshold and the middle threshold and V4 voltage is less than the high voltage causing S1 to be closed, S2 to be open, S3 to be closed, and S4 to be closed. In Mode 4, the V4 voltage is greater than the high threshold and causes S4 to open thus disconnecting the topology 100 from the load.

In one or more embodiments, diode D1 is to block reverse voltage when both rectifiers are conducting (e.g., in mode 1). Diode D2 is to block reverse voltage if a different power supply is sourcing the bus (e.g. this invention power supply regulates to 28V but a different source regulates to 30 V and so the 30 V "wins" and sources the bus). This is referred to as an OR-ing diode. It allows multiple sources into a single bus. The capacitor C1 is a bulk capacitor for charge storage. This allows the rectifier output to smooth the output voltage waveform and to support load transients without causing detrimental voltage drop.

Figure 3:
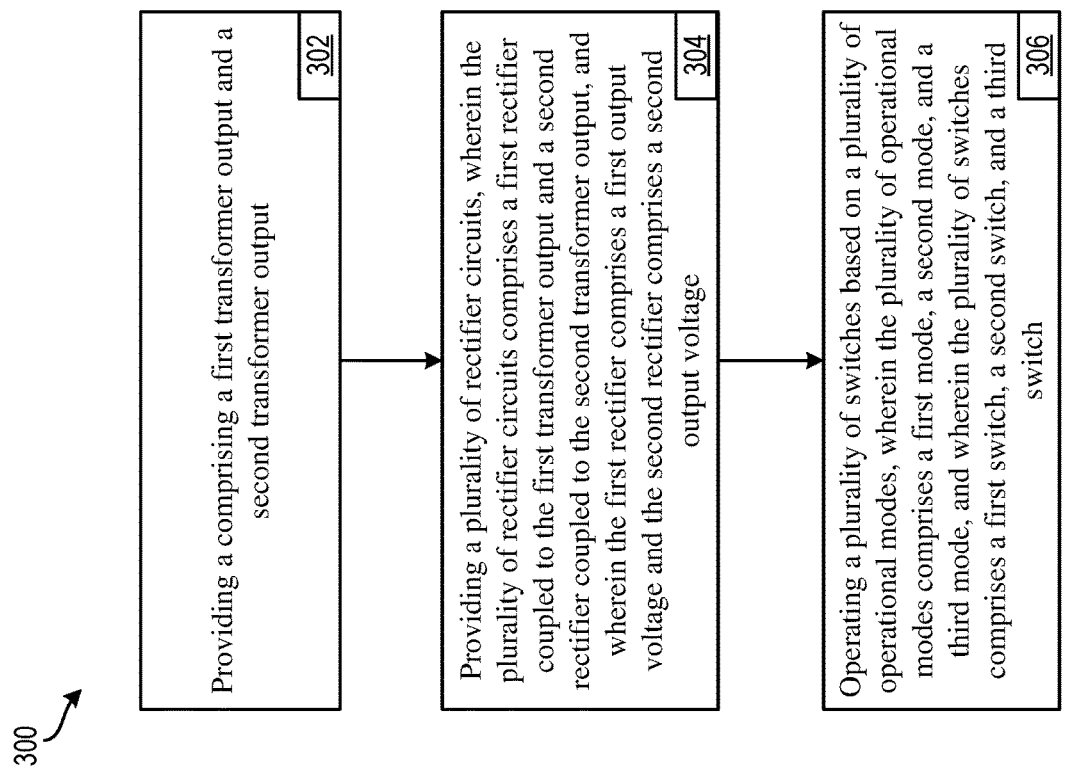
FIG. 3 depicts a flow diagram of a method for operating an transformer rectifier unit according to one or more embodiments.

FIG. 3 depicts a flow diagram of a method for operating a transformer rectifier unit according to one or more embodiments. The method 300 includes providing a first transformer output and a second transformer output, as shown in block 302. The transformer outputs can be from secondary windings within the transformer. The windings can be any configuration including but not limited to Delta and Wye configurations. The primary winding can be of any configuration as well. The method 300, at block 304, includes providing a plurality of rectifier circuits, wherein the plurality of rectifier circuits comprises a first rectifier coupled to the first transformer output and a second rectifier coupled to the second transformer output, and wherein the first rectifier comprises a first output voltage and the second rectifier comprises a second output voltage. The first output voltage and second output voltage can be rectified voltages which provide voltage to a load on the system for a transformer rectifier unit. And at block 306, the method 300 includes operating a plurality of switches based on a plurality of operational modes, wherein the plurality of operational modes comprises a first mode, a second mode, and a third mode, and wherein the plurality of switches comprises a first switch, a second switch, and a third switch. In one or more embodiments, each mode provides a different output voltage depending on the load requirements.

Additional processes may also be included. It should be understood that the processes depicted in FIG. 3 represent illustrations, and that other processes may be added or existing processes may be removed, modified, or rearranged without departing from the scope and spirit of the present disclosure.

Various embodiments are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A system comprising:
a transformer comprising a first transformer output and a second transformer output;
a plurality of rectifier circuits, wherein the plurality of rectifier circuits comprises a first rectifier coupled to the first transformer output and a second rectifier coupled to the second transformer output, and
wherein the first rectifier comprises a first output voltage and the second rectifier comprises a second output voltage;
a plurality of switches, wherein the plurality of switches comprises a first switch, a second switch, and a third switch; and
a logic circuit configured to operate the plurality switches based on a plurality of operational modes, wherein the plurality of operational modes comprises a first mode, a second mode, and a third mode; and wherein operating the plurality of switches based on the first mode comprises:
determining the first output voltage is less than a low threshold voltage; and
based on determining the first output voltage is less than the low threshold voltage, causing the logic circuit to:
operate the first switch in a closed state,
operate the second switch in a closed state, and
operate the third switch in an open state;
wherein operating the plurality of switches based on the second mode comprises:
determining that the first output voltage is greater than a low threshold voltage;
determining that the first output voltage is less than a middle threshold voltage;
based on determining that the first output voltage is greater than the low threshold voltage and less than the middle threshold voltage, causing the logic circuit to:
operate the first switch in an open state,
operate the second switch in a closed state, and
operate the third switch in an open state.

2. The system of claim 1, wherein operating the plurality of switches based on the first mode provides an output voltage comprising the first output voltage and the second output voltage.

3. The system of claim 1, wherein operating the plurality of switches based on the second mode provides an output voltage comprising the first output voltage.

4. The system of claim 1, wherein operating the plurality of switches based on the second mode comprises:
determining that the first output voltage is greater than a middle threshold voltage;
determining that the first output voltage is less than a high threshold voltage;
based on determining that the first output voltage is greater than the middle threshold voltage and less than the high threshold voltage, causing the logic circuit to:
operate the first switch in a closed state,
operate the second switch in an open state, and
operate the third switch in a third state.

5. The system of claim 4, wherein operating the plurality of switches based on the third mode provides an output voltage comprising the second output voltage.

6. The system of claim 1, wherein the plurality of switches further comprise a fourth switch;
wherein the plurality of modes further comprises a fourth mode; and wherein operating the plurality of switches based on the fourth mode comprises:
determining that a source side voltage of the fourth switch is greater than a high threshold voltage;
based on determining that the source side voltage of the fourth switch is greater than the high threshold voltage, causing the logic circuit to:
operate the fourth switch in an open state.

7. The system of claim 6, wherein operating the plurality of switches based on the fourth mode does not provide an output voltage.

8. The system of claim 6, wherein operating the plurality of switches based on the first mode comprises causing the logic circuit to operate the fourth switch in a closed state.

9. The system of claim 6, wherein operating the plurality of switches based on the second mode comprises causing the logic circuit to operate the fourth switch in a closed state.

10. The system of claim 6, wherein operating the plurality of switches based on the third mode comprises causing the logic circuit to operate the fourth switch in a closed state.

11. The system of claim 1, wherein the first switch comprises a p-type metal-oxide semiconductor field effect transistor (MOSFET).

12. The system of claim 1, wherein the first switch comprises an n-type metal-oxide semiconductor field effect transistor (MOSFET).

13. The system of claim 1, wherein the transformer comprises a Delta-Wye transformer.

14. A method for operating a transistor rectifier unit, the method comprising:
providing a first transformer output and a second transformer output;
providing a plurality of rectifier circuits, wherein the plurality of rectifier circuits comprises a first rectifier coupled to the first transformer output and a second rectifier coupled to the second transformer output, and
wherein the first rectifier comprises a first output voltage and the second rectifier comprises a second output voltage;
operating a plurality of switches based on a plurality of operational modes, wherein the plurality of operational modes comprises a first mode, a second mode, and a third mode, and wherein the plurality of switches comprises a first switch, a second switch, and a third switch; and wherein operating the plurality of switches based on the first mode comprises:
determining the first output voltage is less than a low threshold voltage; and
based on determining the first output voltage is less than the low threshold voltage, causing the logic circuit to:
operate the first switch in a closed state,
operate the second switch in a closed state, and
operate the third switch in an open state;
wherein operating the plurality of switches based on the second mode comprises:
determining that the first output voltage is greater than a low threshold voltage;
determining that the first output voltage is less than a middle threshold voltage;
based on determining that the first output voltage is greater than the low threshold voltage and less than the middle threshold voltage, causing the logic circuit to:
operate the first switch in an open state,
operate the second switch in a closed state, and
operate the third switch in an open state.

15. The method of claim 14, wherein operating the plurality of switches based on the first mode provides an output voltage comprising the first output voltage and the second output voltage.

16. The method of claim 14, wherein operating the plurality of switches based on the second mode provides an output voltage comprising the first output voltage.

* * * * *